United States Patent [19]

Lowe

[11] 4,171,041

[45] Oct. 16, 1979

[54] CONVEYOR SYSTEM WITH OBJECT ROTATOR

[76] Inventor: James A. Lowe, P.O. Box 22542, Honolulu, Hi. 96822

[21] Appl. No.: 836,433

[22] Filed: Sep. 26, 1977

Related U.S. Application Data

[63] Continuation-in-part of Ser. No. 743,608, Nov. 22, 1976, abandoned.

[51] Int. Cl.[2] .............................................. B65G 47/24

[52] U.S. Cl. .................................... 198/379; 198/399; 198/412; 118/503; 269/57

[58] Field of Search ............... 198/339, 344, 379, 396, 198/394, 399, 403, 400, 412, 472, 485, 491, 492, 532, 540, 546, 562, 563, 648; 221/156, 173; 193/45, 32, 40, 44; 269/55, 57; 118/218, 230, 232, 319, 320, 500, 503

[56] References Cited

U.S. PATENT DOCUMENTS

| | | | |
|---|---|---|---|
| 715,525 | 12/1902 | Tyberg | 221/173 |
| 1,674,309 | 6/1928 | Topping | 221/173 |
| 2,664,067 | 12/1953 | Martin | 118/232 |
| 2,845,164 | 7/1958 | Stahl | 198/399 |
| 3,478,860 | 11/1969 | Schick | 198/394 |
| 3,603,646 | 9/1971 | Leoff | 193/40 |
| 3,667,420 | 6/1972 | Mechling | 118/232 |
| 3,785,853 | 1/1974 | Kirkman et al. | 118/500 |
| 3,828,727 | 8/1974 | Bauerle | 118/500 |
| 4,081,072 | 3/1978 | Le Vasseur | 221/173 |

*Primary Examiner*—Joseph E. Valenza

[57] ABSTRACT

An arrangement using C-shaped track having inwardly directed flanges and mounted upon a rotatable base is provided such that objects conveyed in the track can be separated, fixed in position, rotated or indexed, and recombined in the track.

2 Claims, 7 Drawing Figures

CONVEYOR SYSTEM WITH OBJECT ROTATOR

This application is a continuation-in-part of Ser. No. 743,608 filed Nov. 22, 1976, now abandoned.

This invention relates to the portion of a conveying system for segregating conveyed objects that are accumulated on the conveyor, positioning the objects individually at a point, and rotating or indexing the objects while at the point, then returning the conveyed objects to the conveyor.

The objects may be any size but should be proportional to the size of the conveyor track. The objects are cast figures, small castings or moldings, or any object that is mounted upon a work holder that fits the conveying system and must be positioned at a work station. The preferred embodiment of the invention includes the casting of the object and the work holder as one piece, thus eliminating the operation of attaching the object to the work holder, and involves the handling of pieces that must be sucessivly stationed for a series of work operations such as spray coating, zone mask spray coating, striping, sanding, or machining.

The apparatus according to the invention is capable of accepting a wide variety of objects privided the objects are mounted upon a consistent workholder, and the apparatus allows for little consideration being required as to the height or width of the conveyed object, so long as the depth of the conveyed object must be less than the length of the workholder.

It is, therefore, a principle object of the invention to provide a conveying system element that will allow for many different types of object to be conveyed in the system and positioned separately at a work point.

Another object of the invention is to allow for rapid change of the positioning function so that production run change over is facilitated. Positioning also includes rotating the work at the work point while still in the conveyor.

Other objects and advantages of the invention will be apparent from the following detailed description of a preferred embodiment thereof, reference being made to the accompanying drawings, in which.

Figure 1:
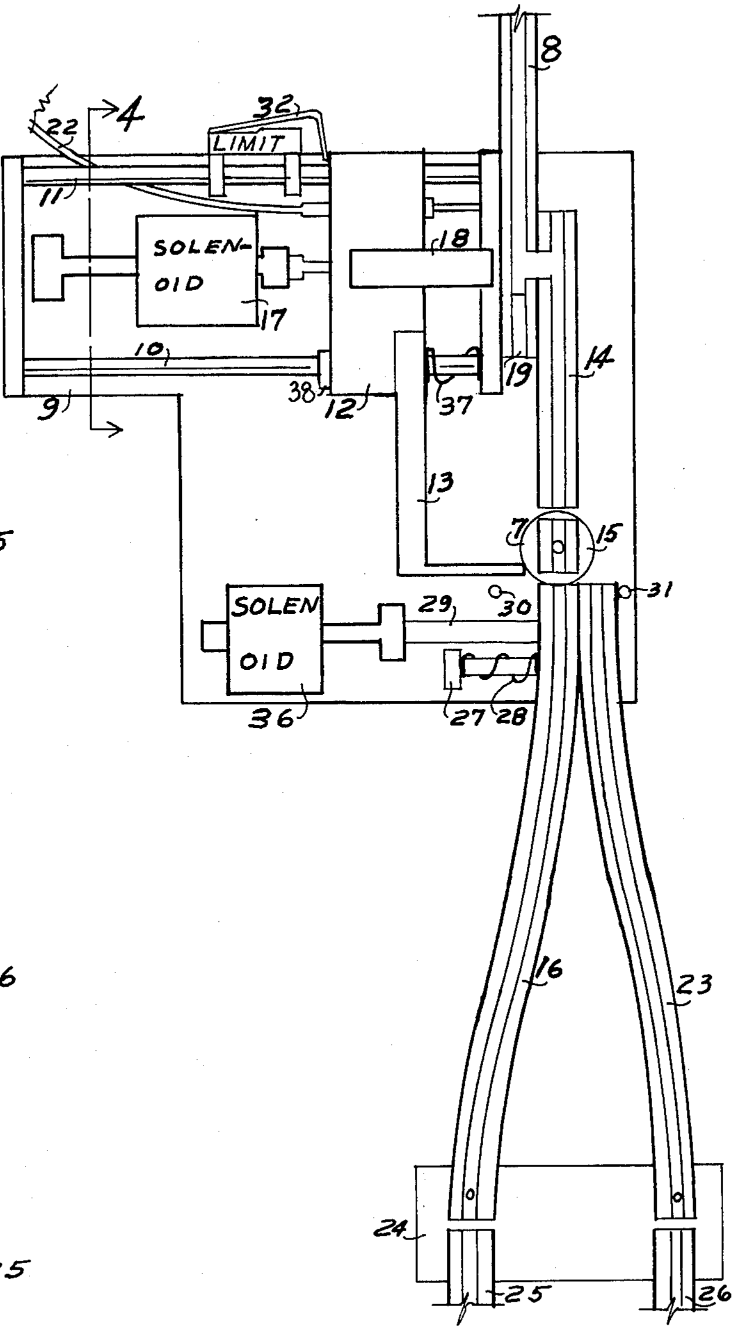
FIG. 1 is an overall front view showing the apparatus without any objects in it.

Referring particularly to FIG. 1, objects are supplied via track 8 and stack up against track stop 19. Limit switch 32 being closed, solenoid 17 urges slide 12 and its main elements separator arm 18 and stop arm 13 rightward in FIG. 1, causing one object to enter separator track 14. The object slides down separator track 14 and arrives at stop arm 13 in rotor track 15.

Figure 4:
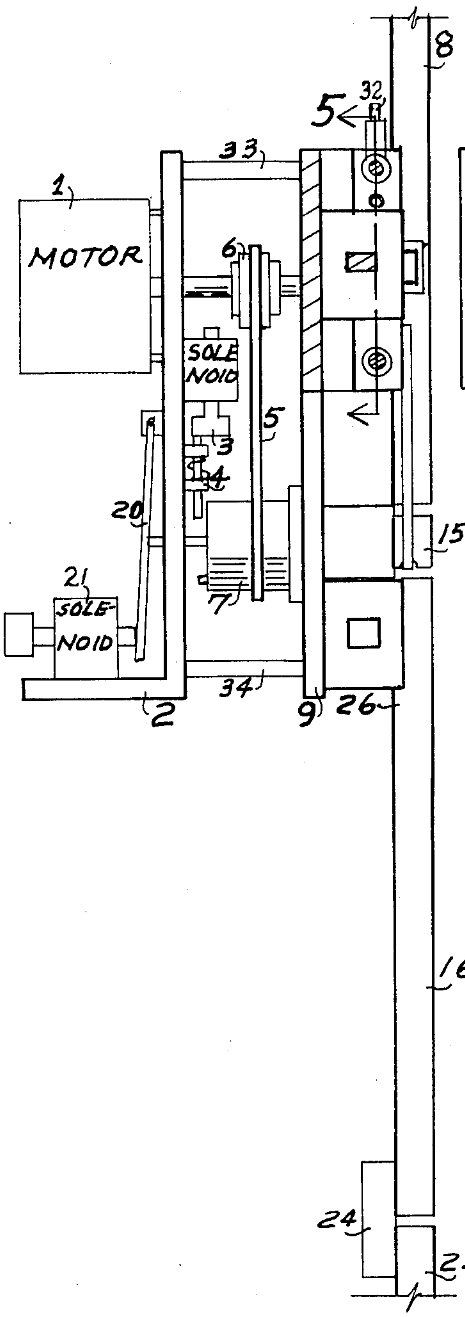
FIG. 4 is a side view of the apparatus.

Referring now to FIG. 4, solenoid 21 urges lock bar *7a* (shown sectionally in FIG. 7) by means of locking lever 20 rightward in FIG. 4, thus urging the object toward the inwardly directed flanges of the C-shaped sectional track, and restraining the object from movement relative to the rotating track 15.

Figure 5:
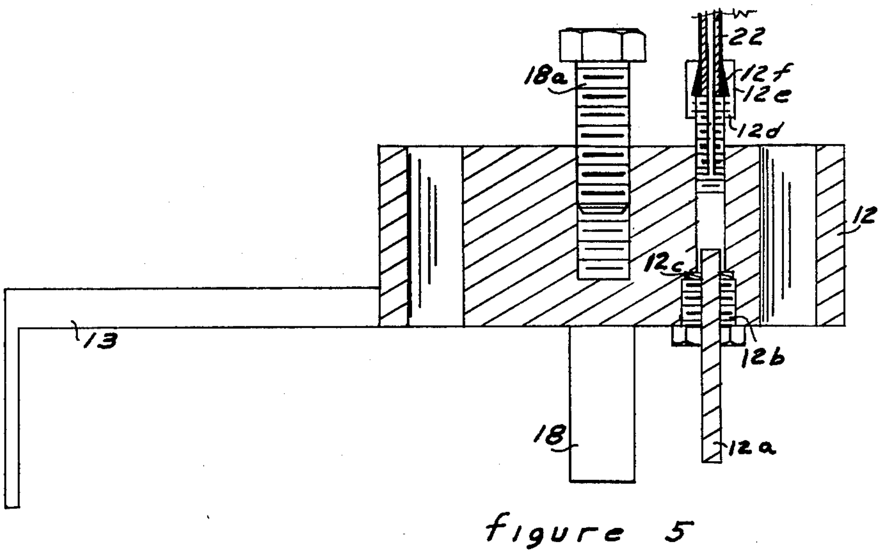
FIG. 5 is a section view of the means for feeding individual objects and stopping them in the track.

Solenoid 17 is deactivated thus allowing spring 37 and piston 12*a* to urge slide 12 leftward in FIG. 1. The arrangement of slide 12, separator arm 18, adjustment 18*a,* stop arm 13 is shown in FIG. 5. FIG. 5 also shows the jam bolt 12*b,* seal 12*c,* sleeve 12*d,* jam nut 12*e,* and air line 22 that form a pneumatic piston shock absorber for the action of the slide. This action together with the adjustment allows for a gentle yet firm action of the separator arm.

Figure 6:
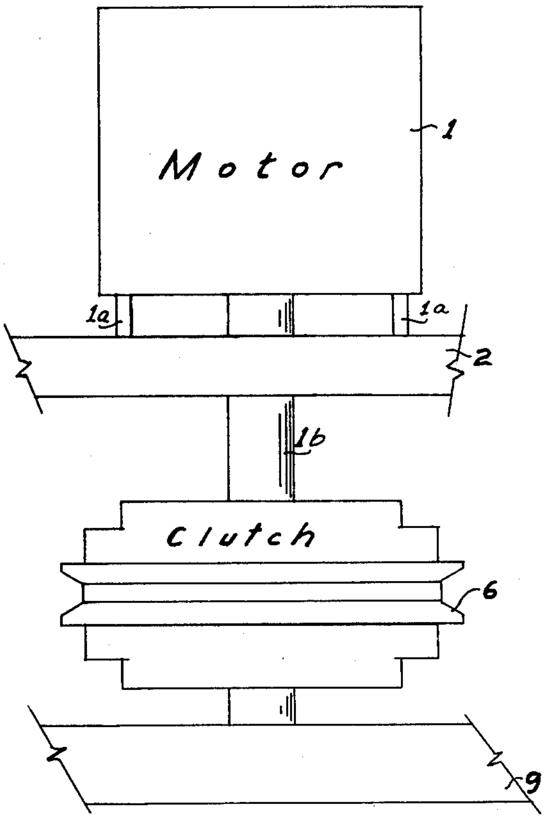
FIG. 6 is a top view of a section of the apparatus showing the arrangement of the rotating and drive means clutch and motor.

Referring now to FIG. 6, the motor 1 drives shaft 1*b* which shaft drives slip clutch 6. The operation of the motor 1 is intermitent or constant at the option of the user. Motor mounts 1*a* attach the motor to base plate 2 and shaft 1*b* rides on a suitable bearing in face plate 9. Through adjustment of the motor drive speed which is usually very slow (10 rpm or less) and the slip clutch tension a gentle rotating urging means can be transferred to the rotor assembly via drive belt 5 (shown in FIG. 4).

Figure 3:
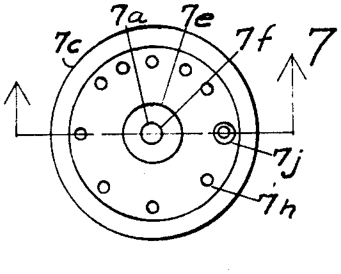
FIG. 3 is a bottom view of the rotating indexing means showing an index pin at *7j;*
Figure 2:
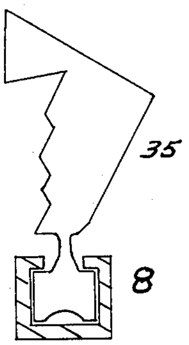
FIG. 2 is a section view through the C-shaped flanged track showing a generalized object on its workholder.
Figure 7:
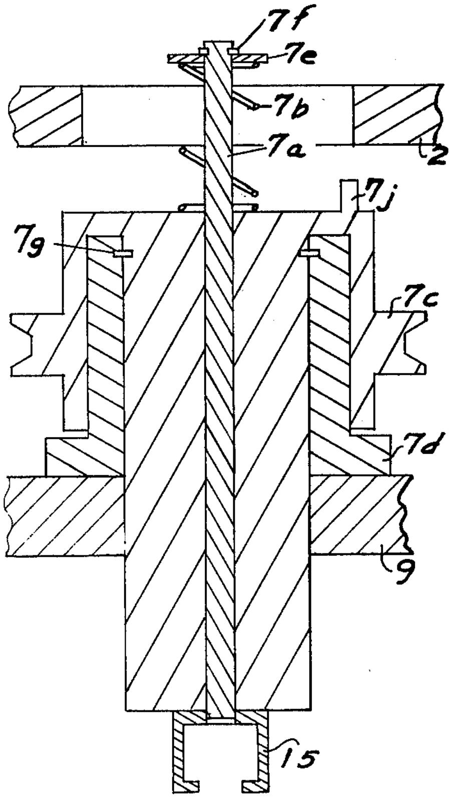
FIG. 7 is a section view of the lock bar and rotating support.

Referring to both FIG. 4 and FIG. 7 solenoid 3 urges rotation latch 4 into the pin-stop *7j,* blocking rotation of the rotor assembly 7. If the apparatus is set up for complete rotations then only one pin-stop is set (as shown in FIG. 3), if the apparatus is set up for one or more indexes, then one additional pin-stop is required for each index (holes *7h* are provided for the purpose (FIG. 3)). The operation of rotation or indexing is generally either/or, that is, it is not likely that both are needed at the work station. The purpose of indexing is to allow the object to be presented in the best position for work at the station, the purpose of rotation is to allow for such operations as spray coating or circular striping or the like. The operation of rotation is not required for still other operations at a work station, and is provided as a feature of the apparatus to make it more usable. Relaxing the solenoid 3 allows rotation latch 4 to release by means of a spring return, thus allowing drive belt 5 to urge rotation upon rotor assembly 7. Careful adjustment of the motor drive speed, slip clutch tension, and timing of the operation of solenoid 3 are required for the successful operation of the rotor assembly.

Referring to FIG. 7, the rotor assembly and its operation is as follows: by means of locking lever 20 (not shown in this figure) which urges lock bar *7a* at a point near clip *7f* through the opening opposite the flanges of rotor track 15, an object is urged toward the flanges of rotor track 15 and held there firmly. Rotor drive *7c* receives turning drive from drive belt 5 (not shown this figure) and is mounted to rotor track 15. Rotor drive *7c* slips around the rotor assembly base *7d,* which is in turn mounted to face plate 9. Rotor drive *7c* is prevented from slipping cylindrically off rotor assembly base *7d* by means of clip *7g.* Clip *7f,* washer *7e* transfer spring compression from spring *7b* to lock bar *7a* thus providing a means of urging lock bar *7a* to return.

At the completion of work at the work station, i.e. at or above rotor track 15, solenoid 36 is activated or not at the option of the operator which activation causes the selection of release track 16 or re-track 23 as the route for further operations upon the object at successive work stations. The means of causing the selection is via connector 29, and is opposed by return assembly 27 and spring 28. Alignment of the release track and re-track is provided by stop 30 and 31. Tracks 25 and 26 are to take away finished work or route work off line as required by the operator. It is usual to use the release track during set up of the work station and the re-track during production.

Operation of the apparatus may be by operator control of contact switches to solenoids, or by any number of timer controls that make up the prior art.

I claim:

1. In an object conveying and rotating apparatus comprising: a rotor assembly means having a C-shaped conveying track, wherein the object to be conveyed and rotated is received within the walls of the track forming the C-shaped cross section, the ends of the C-shaped cross-section having inwardly directed flanges which extend the length of the track, the track being mounted on a rotatable support means such that the opening in the C-shaped track formed by the flanges is opening away from the rotatable support, reciprocable lock bar which passes through the rotatable support and the portion of the track that is opposite the opening formed by the flanges, means to urge the lock bar into contact with the object that is received within the track and to urge the object against the flanges of the track thereby restraining the object from any movement relative to the track, means for selectively rotating the rotatable support to thereby rotate said track and said object, and means to retract the lock bar when the rotating means is stopped.

2. The apparatus of claim 1 further comprising: means to feed individual objects to the rotor assembly means at one longitudinal end of the track and means selectively movable to a position at the opposite longitudinal end of the track for blocking the path of travel of an object which has been fed into the track.

* * * * *